J. Ward.
Brick Machine.
N° 46,055.  Patented Jan. 21, 1865.
2 Sheets. Sheet 1.
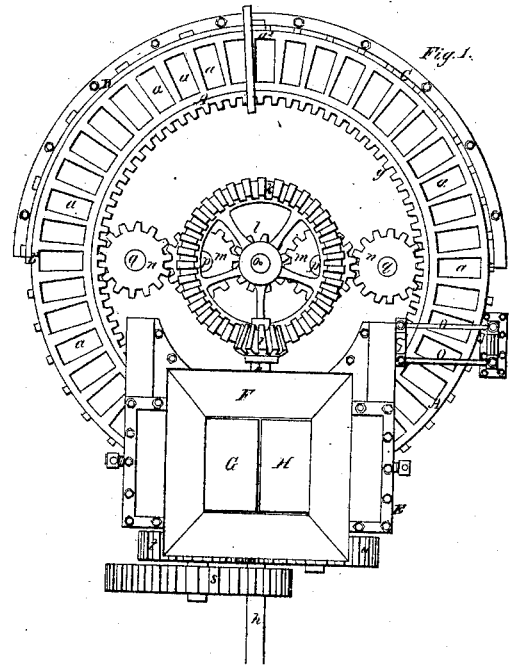
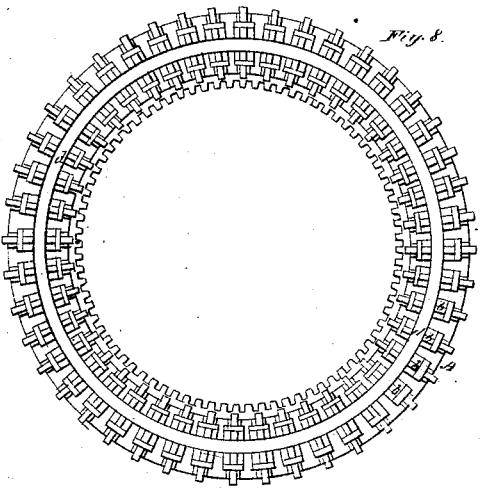
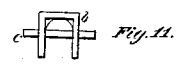
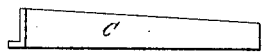
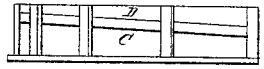
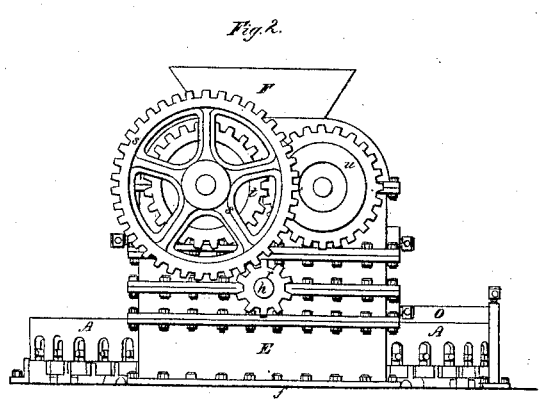
Witnesses.  Inventor.
 James Ward J. Ward,
Brick Machine.

Nº 46,055.  Patented Jan. 24, 1865.

2 Sheets, Sheet 2.

Inventor:
James Ward

UNITED STATES PATENT OFFICE.

JAMES WARD, OF BOSTON, MASSACHUSETTS, ASSIGNOR TO HIMSELF AND GARRETT A. LANS, OF SAME PLACE.

IMPROVED BRICK-MACHINE.

Specification forming part of Letters Patent No. 46,055, dated January 24, 1865.

*To all whom it may concern:*

Be it known that I, JAMES WARD, of Boston, in the county of Suffolk and State of Massachusetts, have invented an Improved Machine for Molding Bricks; and I do hereby declare the same to be fully described in the following specification and represented in the accompanying drawings, of which—

Figure 7:
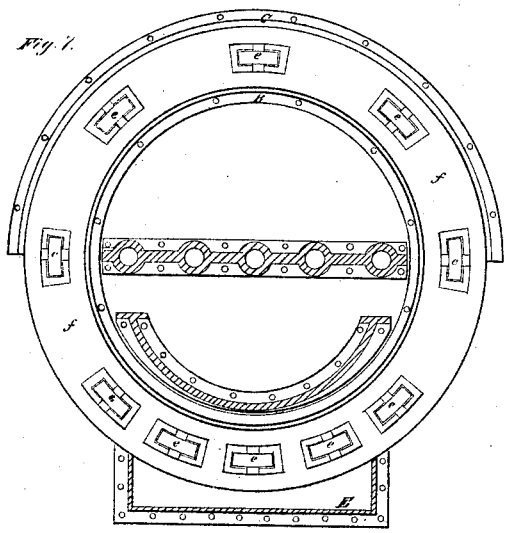
Figure 6:
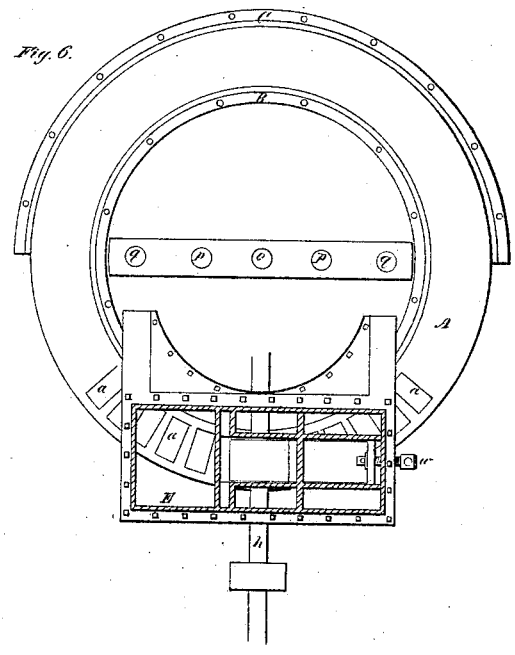
Figure 9:
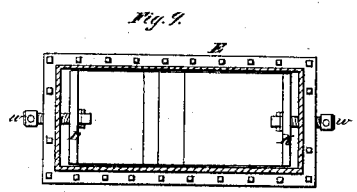
Figure 10:
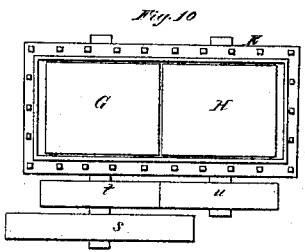
Figure 8:
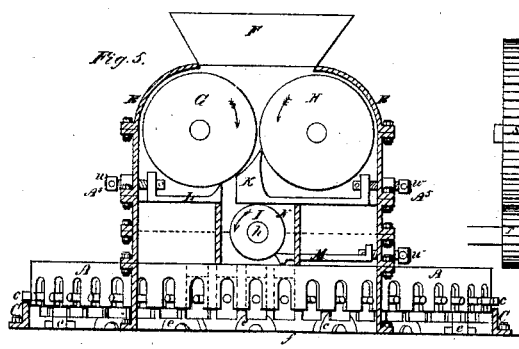
Figure 5:
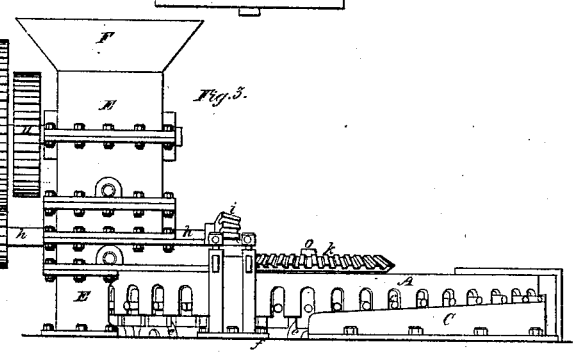

Figure 1 denotes a top view, Fig. 2 a front elevation, Fig. 3 a side elevation, Fig. 4 a longitudinal section, and Fig. 5 a transverse section, of it. Fig. 6 is a horizontal section taken on the line $A^5$ of Fig. 5. Fig. 7 is a top view of the base plate and the friction-rollers, to be hereinafter explained. Fig. 8 is an under side view of the mold-carriage, its plungers, and bearing-rail. Fig. 9 is a top view of the upper adjustable scrapers and their frame. Fig. 10 is a top view of the pulverizing-rollers. Fig. 11 is a side view of one of the mold-plungers. Figs. 12 and 13 are side views of the two halves of the outside cam. Fig. 14 is a side view of the inside cam for operating the mold-plungers.

The present machine, although in some respects like that heretofore invented by me, and described in the specification of the United States Patent No. 36,690, and dated October 14, A. D. 1862, yet differs therefrom in several essential particulars, on which my claims to invention are based. The two machines are alike in having a revolving mold-carriage, provided with molds and plungers, to co-operate with a pair of pulverizing or preparing rollers arranged within a hopper or box; and therefore I do not herein claim such features or the mechanical construction thereof.

The nature of my present invention consists in certain new additions to such a combination, all of which I shall now proceed to describe.

In the drawings, A denotes the mold wheel or carriage, which is a circular annulus provided with a series of matrices or molds, $a\,a\,a$, arranged vertically within and through it, as represented. Each of these molds contains a sliding piston or plunger, $b$, provided with a lifter, $c$, which is a rod going horizontally through and projecting in opposite directions from the plunger. The several plungers straddle an annular rail, $d$, which is fastened to or projects from the under side of the mold-carriage A, and rests on the peripheries of a series of friction-rollers, $e\,e\,e$, arranged within a bearing or bed plate, $f$. (See Figs. 4, 5, and 7.)

A stationary inside-curved cam-rail, B, is arranged concentrically within and in close proximity to the mold-carriage. There is also an external stationary cam-rail, C, disposed outside of the mold-carriage, and having another or cap rail, D, arranged over it, as shown in Figs. 1 and 13, the said covering-rail extending from $a^2$ to $b^2$, as shown in Fig. 1.

The two cam-rails B and C and the lifters $c\,c\,c$ are for effecting the elevation of the plungers within their molds, in order to discharge the molded bricks therefrom, the plungers being subsequently forced downward into the molds by the action of the third rail, D, on the said lifters, the mold-carriage, while in rotary motion, carrying, at proper times, the lifters against the upper edges of the cam-rails B C as well as against the lower edge of the depressing-rail D.

The molding carriage or wheel A is provided with an internal spur-gear, $g$, which receives motion from a horizontal driving-shaft, $h$, by means of two bevel-gears, $i\,k$, and a train of five connection spur-gears, $l\,m\,m\,n\,n$, arranged with respect to one another and the mold-carriage as shown in the drawings. The bevel-gear $k$ and the central connection-gear $l$ are fixed on one vertical shaft, $o$, situated at the center of the mold-carriage, each of the other connection-gears being fixed on a separate shaft, (shown at $p$ or $q$.) The shaft $h$ extends through and has its bearings in a case, E, provided with a hopper, F, and containing two compressing, delivering, or preparing rollers, G H, these latter being arranged below the hopper and within the case in manner as represented in the drawings. The rollers G H derive their rotary motions (in the directions indicated by the arrows placed on them in Fig. 5) by means of a train of gears, $r\,s\,t\,u$, the first of which—viz., the pinion $r$—is fixed on the driving-shaft $h$, while the gears $s$ and $t$ are fixed on the shaft of the roller G, and the gear $u$ is carried by the shaft of the roller H. The arrangement of the driving-shaft and the mechanisms for operating the two rollers G H and the molding-carriage A enables me not only to operate the said rollers and carriage to good advantage, but to employ within the case E an auxiliary delivery-roller, I, and three adjustable scrapers, K L M, which are arranged together and between the rollers G H and the carriage A in manner as represented in Fig. 5.

The scraper K answers a double purpose—viz., to separate the clay from the periphery of the roller H and to guide the clay downward into the chamber N of the roller I—it being forced from such chamber and into the molds by the action of the said roller I. The scrapers L and M serve to remove the clay from their respective rollers G and I and direct it into and out of the chamber N. Each of the scrapers is provided with an adjusting-screw, w, by which it may be moved lengthwise and either toward or away from its roller.

There are arranged over and across the mold-carriage in manner as shown in Figs. 1 and 2 two blades, o o, whose lower edges rest on the upper surface of the said carriage, the purpose of such blades being to scrape down and finish the upper surfaces of the bricks while in the molds, and such molds are moved along underneath the said blades.

In the operation of the above-described machine the clay introduced into the hopper will fall into the bite of the two rollers G H and by them will be compressed and forced down between the roller G and scraper K, and lumps or stones in the clay being broken and pulverized by the rollers. In consequence of the position of the scraper L such clay will be removed from the roller G and caused to descend into the chamber N, the rollers G and H operating to prepare the clay for the molds. The auxiliary roller I revolving within the chamber N will not only aid in preparing the clay, but will operate to force it into the molds while the mold-carriage may be in revolution.

After each mold may have been filled with the clay it will be passed around underneath the finishing-blades, and subsequently the plunger or piston will be forced upward in the mold, so as to expel the clay in the form of a brick, which may be removed from the machine by an attendant. Next, the piston, while being carried around with the wheel, will be lowered in the mold to the proper position for the mold to receive another charge of clay, in which the piston will rest on the top of the rail d, which in turn will be supported by the wheels e.

What I claim as my invention is as follows, that is to say—

1. The combination and arrangement of the two adjustable surfaces K L with the preparing-rollers G H, the case E, and the mold-carriage A.

2. The combination of the auxiliary roller I, its chamber N, and its adjustable scraper M with the mold-carriage A, the rollers G H, the case E, and the scrapers K L, arranged together and within the case E, substantially as specified.

3. The arrangement of the mold-wheel A, the case E, the shaft h, the roller I, the chamber N, and the mechanism for operating the rollers G H and the mold-carriage A.

4. The combination and arrangement of the annular rail d and the series of friction-rollers e with the mold-carriage and the series of plungers thereof.

5. The combination and arrangement of the series of lifters c and their cams B C D, with the rotary mold-carriage A, the rail d, and the series of friction-wheels e.

JAMES WARD.

Witnesses:
 R. H. EDDY,
 F. P. HALE, Jr.